(12) United States Patent
Hou

(10) Patent No.: US 10,477,138 B2
(45) Date of Patent: Nov. 12, 2019

(54) METHODS AND SYSTEMS FOR PRESENTING SPECIFIC INFORMATION IN A VIRTUAL REALITY ENVIRONMENT

(71) Applicant: Hooloop Corporation, Taipei (TW)

(72) Inventor: Yi-An Hou, Taipei (TW)

(73) Assignee: HOOLOOP CORPORATION, Taipei (TW)

(*) Notice: Subject to any disclaimer, the term of this patent is extended or adjusted under 35 U.S.C. 154(b) by 22 days.

(21) Appl. No.: 15/647,304

(22) Filed: Jul. 12, 2017

(65) Prior Publication Data

US 2018/0048852 A1 Feb. 15, 2018

(30) Foreign Application Priority Data

Aug. 11, 2016 (TW) .............................. 105125540 A

(51) Int. Cl.
| | |
|---|---|
| G06F 17/30 | (2006.01) |
| H04N 5/775 | (2006.01) |
| G06F 16/00 | (2019.01) |
| G06F 8/38 | (2018.01) |
| G06F 9/44 | (2018.01) |
| G06Q 30/02 | (2012.01) |
| H04N 7/173 | (2011.01) |
| G06Q 30/00 | (2012.01) |
| G06T 15/00 | (2011.01) |

(52) U.S. Cl.
CPC .............. *H04N 5/775* (2013.01); *G06F 8/38* (2013.01); *G06F 9/44* (2013.01); *G06F 16/00* (2019.01); *G06Q 30/0277* (2013.01); *H04N 7/173* (2013.01); *G06Q 30/00* (2013.01); *G06T 15/00* (2013.01)

(58) Field of Classification Search
CPC .............. G06F 17/30; G06F 9/44; G06F 8/38
See application file for complete search history.

(56) References Cited

U.S. PATENT DOCUMENTS

| | | | |
|---|---|---|---|
| 2014/0278847 A1* | 9/2014 | Gallo ................. | G06Q 30/0252 705/14.5 |
| 2016/0063767 A1 | 3/2016 | Lee et al. | |
| 2016/0133052 A1 | 5/2016 | Choi et al. | |

FOREIGN PATENT DOCUMENTS

| | | |
|---|---|---|
| CN | 105389001 A | 3/2016 |
| CN | 105589732 A | 5/2016 |

* cited by examiner

*Primary Examiner* — Andrea C Leggett
(74) *Attorney, Agent, or Firm* — McClure, Qualey & Rodack, LLP

(57) ABSTRACT

Methods and systems for presenting specific information in a virtual reality environment are provided. First, reality information including at least one specific object, regarding to an environment is provided. It is determined whether specific information corresponding to the specific object is received or not. When the specific information corresponding to the specific object is received, the specific information and the reality information are integrated to generate specific reality information regarding to the environment, in which the specific information is displayed at a position corresponding to the specific object in the environment when the specific reality information is viewed.

6 Claims, 11 Drawing Sheets

METHODS AND SYSTEMS FOR PRESENTING SPECIFIC INFORMATION IN A VIRTUAL REALITY ENVIRONMENT

BACKGROUND OF THE INVENTION

Field of the Invention

The disclosure relates generally to methods and systems for presenting specific information in a virtual reality environment, and, more particularly to methods and systems that can present various specific information in reality information corresponding to an environment.

Description of the Related Art

Recently, portable devices, such as smart phones or notebooks, have become more and more technically advanced and multifunctional. For example, a portable device may have network connecting capabilities. Users can use their portable devices to connect to networks anytime and anywhere. Due to increased convenience and expanded functionalities of the devices, these devices have become necessities of life.

On the other hand, VR (Virtual Reality) technology has been widely used in the fields of teaching, environment navigation, flying training, and others. VR technology uses 3D technology to simulate a 3D virtual environment. Users can use an electronic device, such as a computer or a portable device to interact with virtual objects in the environment. Generally, users can use a monitor or wear a specific electronic device to view reality information corresponding to an environment. Traditionally, the reality information is presented in a monitor using a manner of pictures. Users can use a mouse or a keyboard to control and view an environment corresponding to the reality information. Additionally, in some cases, once a specific device, such as a helmet display is worn by users, the reality information will be directly displayed in the display. Users can view the environment corresponding to the reality information via the specific device.

Generally, reality information corresponding to an environment is build once. For example, a content maker can design reality information corresponding to an environment. Once the reality information corresponding to the environment is build, users can view the reality information via an electronic device. Since the conventional VR technology does not have the capabilities for dynamically presenting specific information, the contents in the reality information will not be changed until the content maker re-builds the corresponding reality information of the environment. In other words, when any information in the reality information needs to be changed, even though the changed information is a tiny part of the reality information, the entire reality information corresponding to the environment must be re-build. The process is inefficient, and the consumption of system resources is serious.

BRIEF SUMMARY OF THE INVENTION

Methods and systems for presenting specific information in a virtual reality environment are provided, wherein various specific information can be presented in reality information corresponding to an environment.

In an embodiment of a method for presenting specific information in a virtual reality environment, reality information corresponding to an environment is provided, wherein the reality information comprises at least one specific object. It is determined whether specific information corresponding to the specific object is received or not. When the specific information corresponding to the specific object is received, the specific information and the reality information are integrated to generate specific reality information corresponding to the environment, in which the specific information is displayed at a position corresponding to the specific object in the environment when the specific reality information is viewed.

An embodiment of a system for presenting specific information in a virtual reality environment comprises a storage unit and a processing unit. The storage unit comprises reality information corresponding to an environment, wherein the reality information comprises at least one specific object. The processing unit determines whether specific information corresponding to the specific object is received or not. When the specific information corresponding to the specific object is received, the processing unit integrates the specific information and the reality information to generate specific reality information corresponding to the environment, in which the specific information is displayed at a position corresponding to the specific object in the environment when the specific reality information is viewed.

In some embodiments, a content providing device transmits the specific information to an electronic device, and the electronic device periodically determines whether the specific information is received, and periodically generates the specific reality information corresponding to the environment when the specific information is received.

In some embodiments, the specific reality information is obtained by a user device, a posture of the user device is obtained, and the specific reality information corresponding to the environment is viewed according to the posture of the user device, wherein when a candidate reality portion determined according to the posture of the user device comprises the specific object, the specific information is displayed at the position corresponding to the specific object.

In some embodiments, the user device determines whether the specific reality information corresponding to the environment in the user device conforms to the specific reality information corresponding to the environment in the electronic device. When the specific reality information corresponding to the environment in the user device does not conform to the specific reality information corresponding to the environment in the electronic device, the specific reality information corresponding to the environment in the user device is replaced by the specific reality information corresponding to the environment in the electronic device.

In some embodiments, after the specific reality information corresponding to the environment is generated, the specific reality information corresponding to the environment is published to a network server via a network, wherein the determination of whether the specific reality information corresponding to the environment in the user device conforms to the specific reality information corresponding to the environment in the electronic device is performed by determining whether the specific reality information corresponding to the environment in the user device conforms to the specific reality information corresponding to the environment in the network server.

In an embodiment of a method for presenting specific information in a virtual reality environment, reality information corresponding to an environment is provided, wherein the reality information comprises at least one specific object, and a plurality of candidate specific information corresponding to the specific object is provided. One of the candidate specific information is selected, and the selected candidate specific information and the reality information are integrated to generate specific reality information corresponding to the environment, in which the selected candidate specific information is displayed at a position corresponding to the specific object in the environment when the specific reality information is viewed.

An embodiment of a system for presenting specific information in a virtual reality environment comprises a storage unit and a processing unit. The storage unit comprises reality information corresponding to an environment, wherein the reality information comprises at least one specific object, and a plurality of candidate specific information corresponding to the specific object. The processing unit selects one of the candidate specific information, and integrates the selected candidate specific information and the reality information to generate specific reality information corresponding to the environment, in which the selected candidate specific information is displayed at a position corresponding to the specific object in the environment when the specific reality information is viewed.

In some embodiments, a current time is obtained, and one of the candidate specific information is selected according to the current time.

Methods for presenting specific information in a virtual reality environment may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for presenting specific information in a virtual reality environment are provided.

Figure 1:
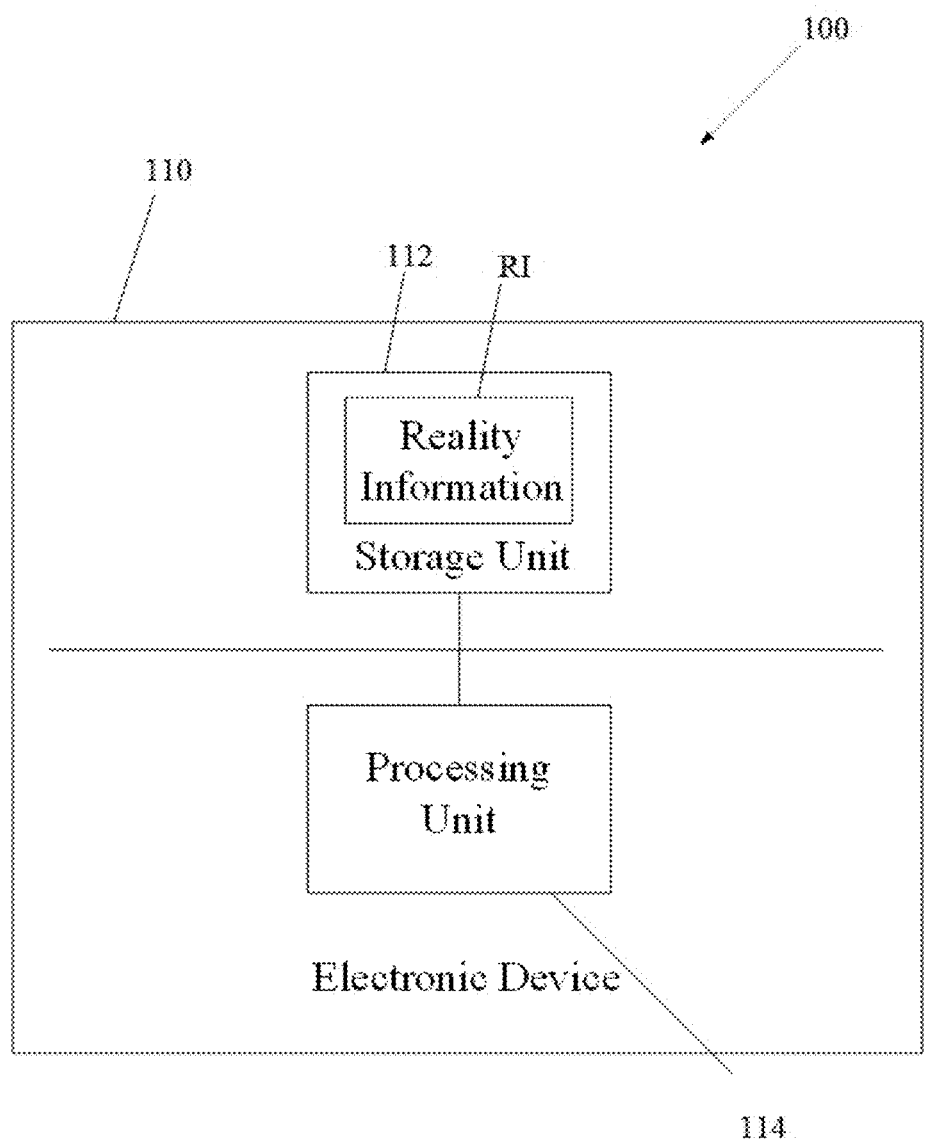
FIG. 1 is a schematic diagram illustrating an embodiment of a system for presenting specific information in a virtual reality environment of the invention.

FIG. 1 is a schematic diagram illustrating an embodiment of a system for presenting specific information in a virtual reality environment of the invention. The system for presenting specific information in a virtual reality environment of the invention 100 comprises an electronic device 110, such as a server, a computer, or a portable device such as a camera, a mobile phone, a smart phone, a PDA (Personal Digital Assistant), a GPS (Global Positioning System), a wearable electronic device, or a notebook. The electronic device 110 comprises a storage unit 112 and a processing unit 114. The storage unit 112 can store related data, such as reality information RI corresponding to an environment, and/or any information generated based on the reality information RI. It is noted that, the reality information RI can comprise a plurality of objects, and each object is defined at a position corresponding to a specific orientation in the environment. It is understood that, in some embodiments, the electronic device 110 can provide a user interface for selecting at least one specific object from the objects in the reality information RI. Additionally, in some embodiments, the electronic device 110 can receive specific information, such as advertisement information corresponding to the at least one specific object. The use of the specific object and the specific information is discussed later. It is noted that, a corresponding environment can be constructed using the reality information RI. It is understood that, in some embodiments, the reality information RI may be image data composed of at least one statistic image or at least a series of images. It is noted that, in some embodiments, the reality information RI can be composed of image data in various orientations corresponding to an environment. Additionally, in some embodiments, the images can be used to generate the reality information using an image stitching software. The processing unit 114 can control related operations of hardware and software in the electronic device 110, and perform the methods for presenting specific information in a virtual reality environment of the invention, which will be discussed later.

Figure 2:
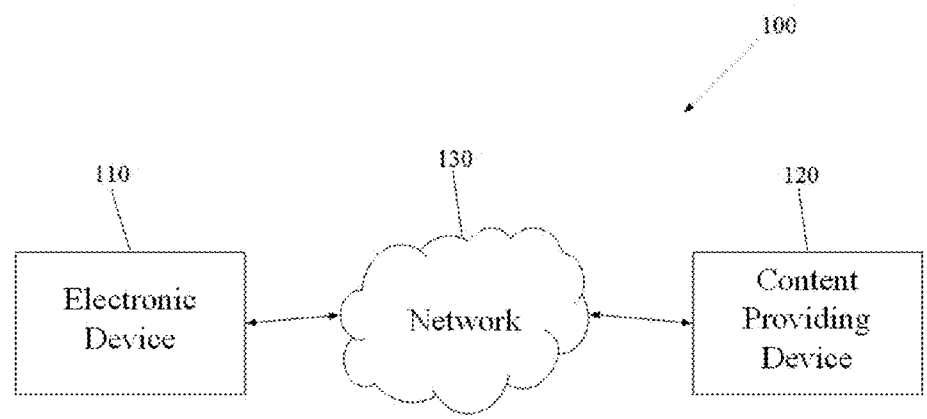
FIG. 2 is a schematic diagram illustrating another embodiment of a system for presenting specific information in a virtual reality environment of the invention.

FIG. 2 is a schematic diagram illustrating another embodiment of a system for presenting specific information in a virtual reality environment of the invention. The system for presenting specific information in a virtual reality environment of the invention 100 comprises an electronic device 110 and a content providing device 120. Similarly, the electronic device 110 may be a server, a computer, or a portable device such as a camera, a mobile phone, a smart phone, a PDA, a GPS, a wearable electronic device, or a notebook. In addition to the components in FIG. 1, the electronic device 110 can comprise a network connecting unit (not shown in FIGS. 1 and 2). The network connecting unit can connect to a network 130, such as a wired network, a telecommunication network, and a wireless network. The electronic device 110 can have network connecting capabilities by using the network connecting unit. The content providing device 120 may be a server, a computer, or a portable device such as a camera, a mobile phone, a smart phone, a PDA, a GPS, a wearable electronic device, or a notebook. The content providing device 120 can couple to the electronic device 110 via the network 130. As described, the electronic device 110 can receive specific information corresponding to at least one specific object in the reality information RI. In some embodiments, the content providing device 120 can transmit the specific information corresponding to at least one specific object to the electronic device 110.

Figure 3:
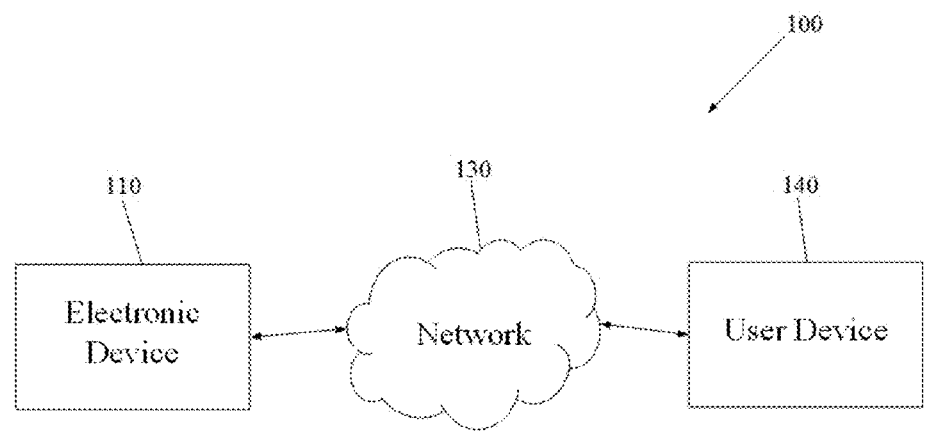
FIG. 3 is a schematic diagram illustrating another embodiment of a system for presenting specific information in a virtual reality environment of the invention.

FIG. 3 is a schematic diagram illustrating another embodiment of a system for presenting specific information in a virtual reality environment of the invention. The system for presenting specific information in a virtual reality environment of the invention 100 comprises an electronic device 110 and a user device 140. Similarly, the electronic device 110 may be a server, a computer, or a portable device such as a camera, a mobile phone, a smart phone, a PDA, a GPS, a wearable electronic device, or a notebook. In addition to the components in FIG. 1, the electronic device 110 can comprise a network connecting unit (not shown in FIGS. 1 and 3). The network connecting unit can connect to a network 130, such as a wired network, a telecommunication network, and a wireless network. The electronic device 110 can have network connecting capabilities by using the network connecting unit. The user device 140 may be a camera, a mobile phone, a smart phone, a PDA, a GPS, a wearable electronic device, a notebook, or other portable device. The user device 140 can couple to the electronic device 110 via the network 130 to obtain the reality information RI and/or any information generated based on the reality information RI.

Figure 4:
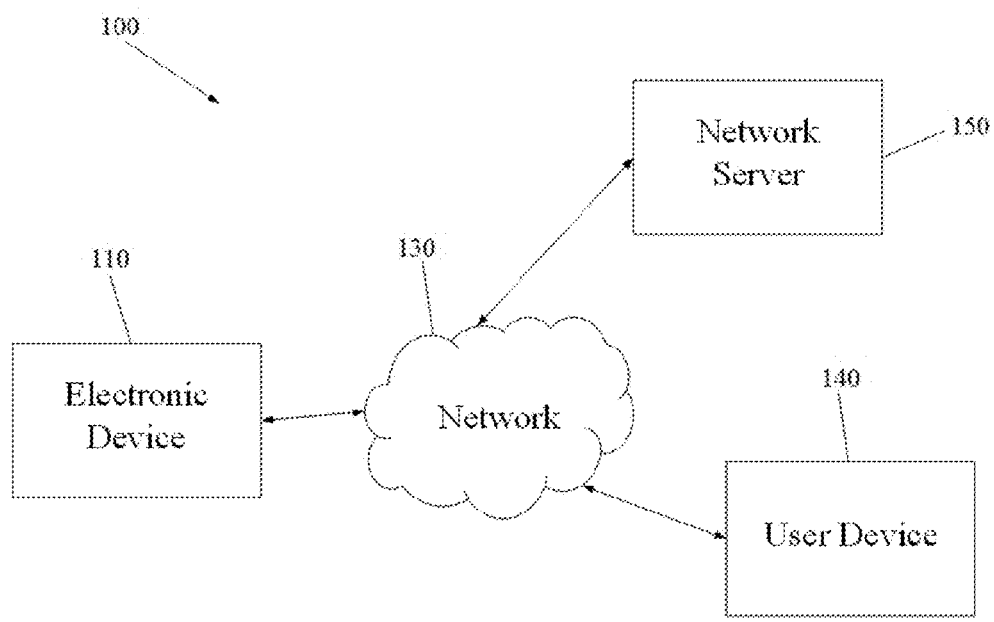
FIG. 4 is a schematic diagram illustrating another embodiment of a system for presenting specific information in a virtual reality environment of the invention.

FIG. 4 is a schematic diagram illustrating another embodiment of a system for presenting specific information in a virtual reality environment of the invention. The system for presenting specific information in a virtual reality environment of the invention 100 comprises an electronic device 110, a user device 140, and a network server 150. Similarly, the electronic device 110 may be a server, a computer, or a portable device such as a camera, a mobile phone, a smart phone, a PDA, a GPS, a wearable electronic device, or a notebook. In addition to the components in FIG. 1, the electronic device 110 can comprise a network connecting unit (not shown in FIGS. 1 and 4). The network connecting unit can connect to a network 130, such as a wired network, a telecommunication network, and a wireless network. The electronic device 110 can have network connecting capabilities by using the network connecting unit. The user device 140 may be a camera, a mobile phone, a smart phone, a PDA, a GPS, a wearable electronic device, a notebook, or other portable device. The user device 140 can couple to the electronic device 110 via the network 130. The network server 150 can be any processor-based electronic device, and provide a network service. In some embodiments, the network server 150 may be a content service platform. In other words, the electronic device 110 can transmit/publish the reality information RI and/or any information generated based on the reality information RI to the network server 150 via the network 130, thus providing the data to be accessed by other users, such as at least one member of the content service platform. On the other hand, the user device 140 can obtain the reality information RI and/or any information generated based on the reality information RI from the electronic device 110 and/or the network server 150 via the network 130.

Figure 5:
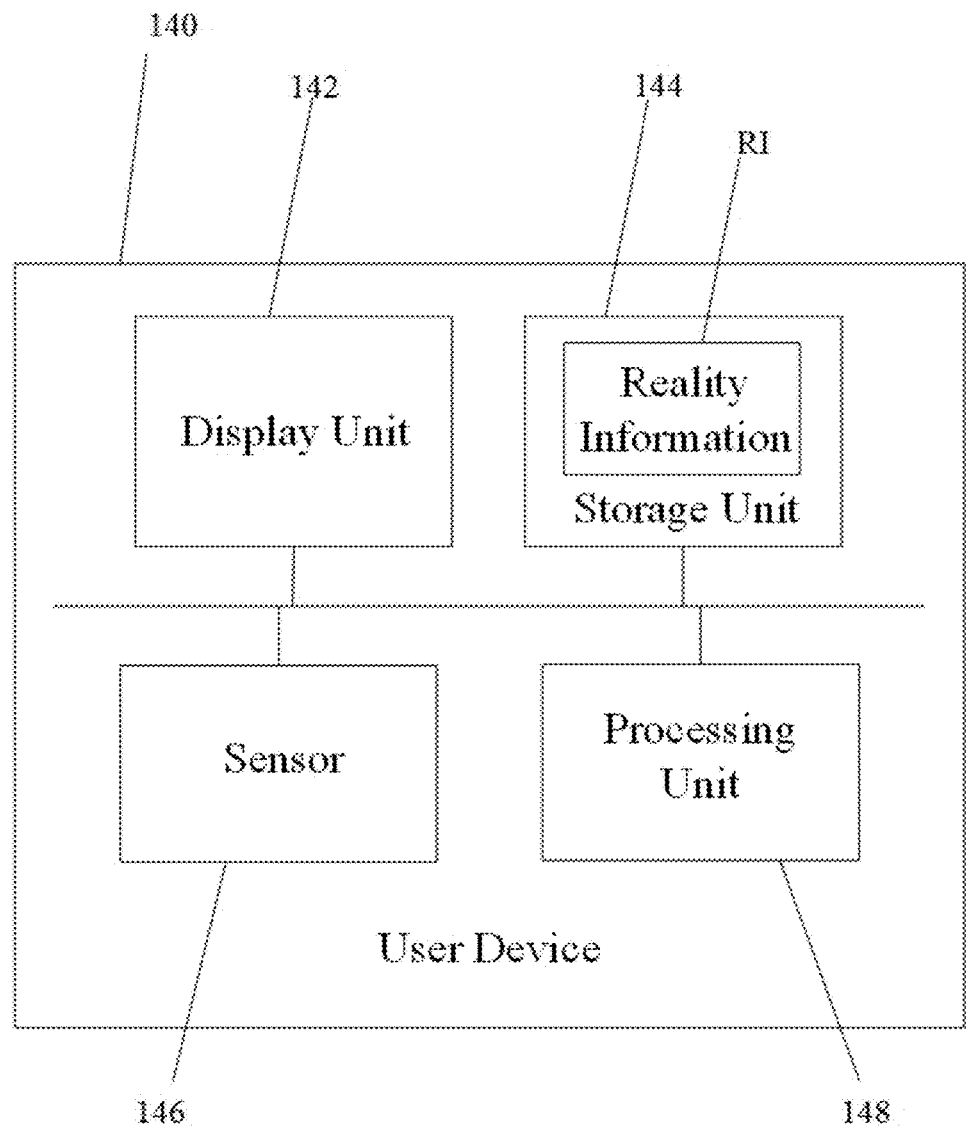
FIG. 5 is a schematic diagram illustrating an embodiment of a user device of the invention.

FIG. 5 is a schematic diagram illustrating an embodiment of a user device of the invention. The user device 140 may be a camera, a mobile phone, a smart phone, a PDA, a GPS, a wearable electronic device, a notebook, or other portable device. The user device 140 comprises a display unit 142, a storage unit 144, a sensor 146, and a processing unit 148. The display unit 142 can display related information, such as images, interfaces, and/or related data. The storage unit 144 can store related data, such as the reality information RI and/or any information generated based on the reality information RI obtained from the electronic device 110 and/or the network server 150. As described, the reality information RI can comprise a plurality of objects, and each object is defined at a position corresponding to a specific orientation in the environment. It is noted that, a corresponding environment can be constructed using the reality information RI. It is understood that, in some embodiments, the reality information RI may be image data composed of at least one statistic image or at least a series of images. It is noted that, in some embodiments, the reality information RI can be composed of image data in various orientations corresponding to an environment. Additionally, in some embodiments, the images can be used to generate the reality information using an image stitching software. The sensor 146 can detect a posture corresponding to the user device 140. It is understood that, in some embodiments, the posture can comprise orientation information of the user device 140, an elevation or depression angle of the user device 140, and/or a horizontal level of the user device 140. It is noted that, in some embodiments, the sensor 146 may be an accelerometer and/or a Gyro sensor. It is noted that, the above sensors are only examples of the present application, and the present invention is not limited thereto. The processing unit 148 can control related operations of hardware and software in the user device 140, and perform the methods for presenting specific information in a virtual reality environment of the invention, which will be discussed later. It is understood that, in some embodiments, the user device 140 can comprise a network connecting unit (not shown in FIG. 5). The network connecting unit can connect to a network, such as a wired network, a telecommunication network, and a wireless network. The user device 140 can have network connecting capabilities by using the network connecting unit. It is noted that, in some embodiments, the user device 140 can obtain the reality information RI and/or any information generated based on the reality information RI from the electronic device 110 and/or the network server 150 via a network.

Figure 6:
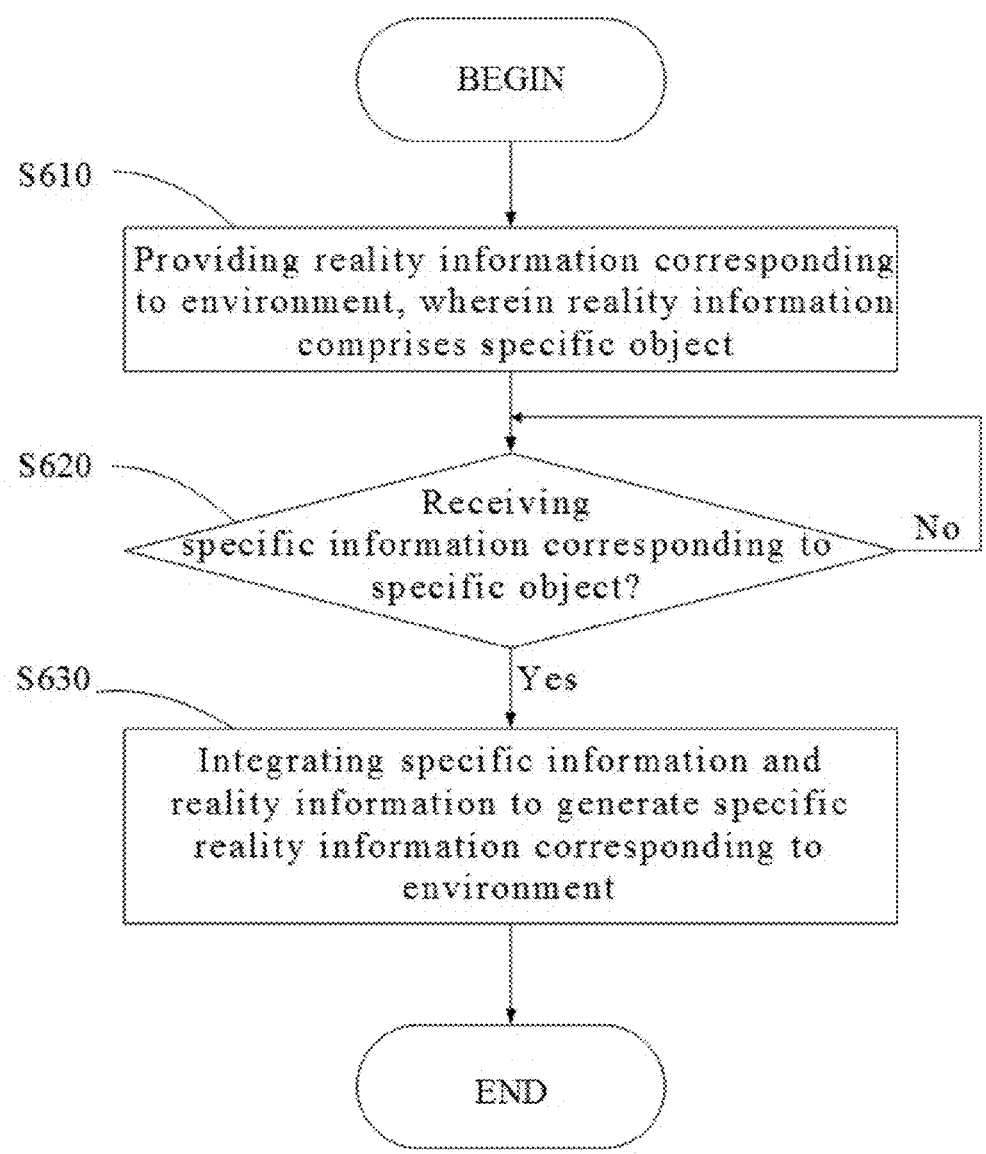
FIG. 6 is a flowchart of an embodiment of a method for presenting specific information in a virtual reality environment of the invention.

FIG. 6 is a flowchart of an embodiment of a method for presenting specific information in a virtual reality environment of the invention. The method for presenting specific information in a virtual reality environment of the invention can be used in the electronic device 110 in FIG. 1.

In step S610, reality information corresponding to an environment is provided. It is noted that, the reality information comprises at least one specific object, and the specific object is defined at a position corresponding to a specific orientation in the environment. It is noted that, the reality information comprises a plurality of objects, and each object is defined at a position corresponding to a specific orientation in the environment. It is understood that, in some embodiments, a user interface for selecting at least one specific object from the objects in the reality information can be provided. It is noted that, a corresponding environment can be constructed using the reality information. It is understood that, in some embodiments, the reality information may be image data composed of at least one statistic image or at least a series of images. It is noted that, in some embodiments, the reality information can be composed of image data in various orientations corresponding to an environment. Additionally, in some embodiments, the images can be used to generate the reality information using an image stitching software. In step S620, it is determined whether specific information corresponding to the specific object is received or not. It is understood that, in some embodiments, a content providing device 120 can connect to the electronic device 110 via a network, and transmit the specific information corresponding to the specific object to the electronic device 110. When the specific information corresponding to the specific object is not received (No in step S620), the procedure remains at step S620. When the specific information corresponding to the specific object is received (Yes in step S620), in step S630, the specific information and the reality information are integrated to generate specific reality information corresponding to the environment. It is noted that, the specific information is displayed at a position corresponding to the specific object in the environment when the specific reality information is viewed. It is understood that, in some embodiments, when the reality information is first viewed, no information is displayed at the position corresponding to the specific object in the environment. After the specific information and the reality information are integrated, and the specific reality information is therefore generated, the specific information is displayed at a position corresponding to the specific object in the environment. In some embodiments, when the reality information is first viewed, preset information is displayed at the position corresponding to the specific object in the environment. After the specific information and the reality information are integrated, and the specific reality information is therefore generated, the preset information is replaced by the specific information, and the specific information is displayed at a position corresponding to the specific object in the environment. Additionally, in some embodiments, the electronic device 110 can transmit/publish the specific reality information to the network server 150 via a network, thus providing the specific reality information to be accessed by other users, such as at least one member of the content service platform.

Figure 7:
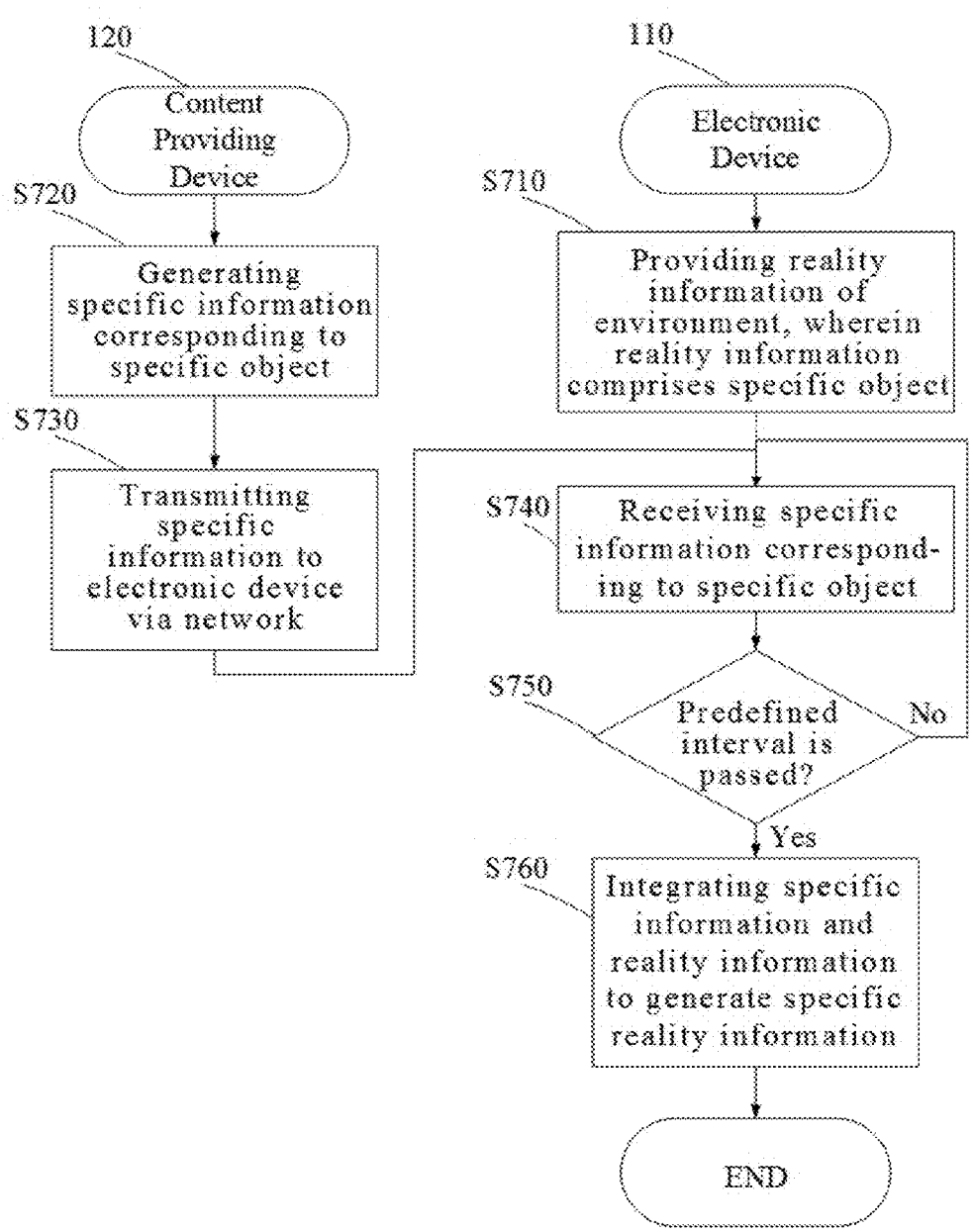
FIG. 7 is a flowchart of another embodiment of a method for presenting specific information in a virtual reality environment of the invention.

FIG. 7 is a flowchart of another embodiment of a method for presenting specific information in a virtual reality environment of the invention. The method for presenting specific information in a virtual reality environment of the invention can be used in the electronic device 110 and the content providing device 120 in FIG. 2.

In step S710, reality information corresponding to an environment is provided in the electronic device 110. It is noted that, the reality information comprises a plurality of objects, and each object is defined at a position corresponding to a specific orientation in the environment. It is noted that, a corresponding environment can be constructed using the reality information. It is understood that, in some embodiments, the reality information may be image data composed of at least one statistic image or at least a series of images. It is noted that, in some embodiments, the reality information can be composed of image data in various orientations corresponding to an environment. Additionally, in some embodiments, the images can be used to generate the reality information using an image stitching software. In step S720, the content providing device 120 generate specific information corresponding to a specific object in the reality information, and in step S730, transmits the specific information corresponding to the specific object to the electronic device 110 via a network. It is understood that, in some embodiments, the content providing device 120 can select the specific object from the objects in the reality information via a user interface provided by the electronic device 110. At the time, in step S740, the electronic device 110 receives the specific information corresponding to the specific object in the reality information, and stores the specific information. In step S750, it is determined whether a predefined interval is passed or not. When the predefined interval is not passed yet (No in step S750), the procedure returns to step S740. When the predefined interval is passed (Yes in step S750), in step S760, the received specific information and the reality information are integrated to generate specific reality information corresponding to the environment. In other words, in some embodiments, the electronic device 110 can periodically determines whether the specific information is received, and periodically generates the specific reality information corresponding to the environment when the specific information is received. It is noted that, the specific information is displayed at a position corresponding to the specific object in the environment when the specific reality information is viewed. Similarly, in some embodiments, when the reality information is first viewed, no information is displayed at the position corresponding to the specific object in the environment. After the specific information and the reality information are integrated, and the specific reality information is therefore generated, the specific information is displayed at a position corresponding to the specific object in the environment. In some embodiments, when the reality information is first viewed, preset information is displayed at the position corresponding to the specific object in the environment. After the specific information and the reality information are integrated, and the specific reality information is therefore generated, the preset information is replaced by the specific information, and the specific information is displayed at a position corresponding to the specific object in the environment. It is noted that, in some embodiments, the electronic device 110 can transmit/publish the specific reality information to the network server 150 via a network, thus providing the specific reality information to be accessed by other users, such as at least one member of the content service platform.

Figure 8:
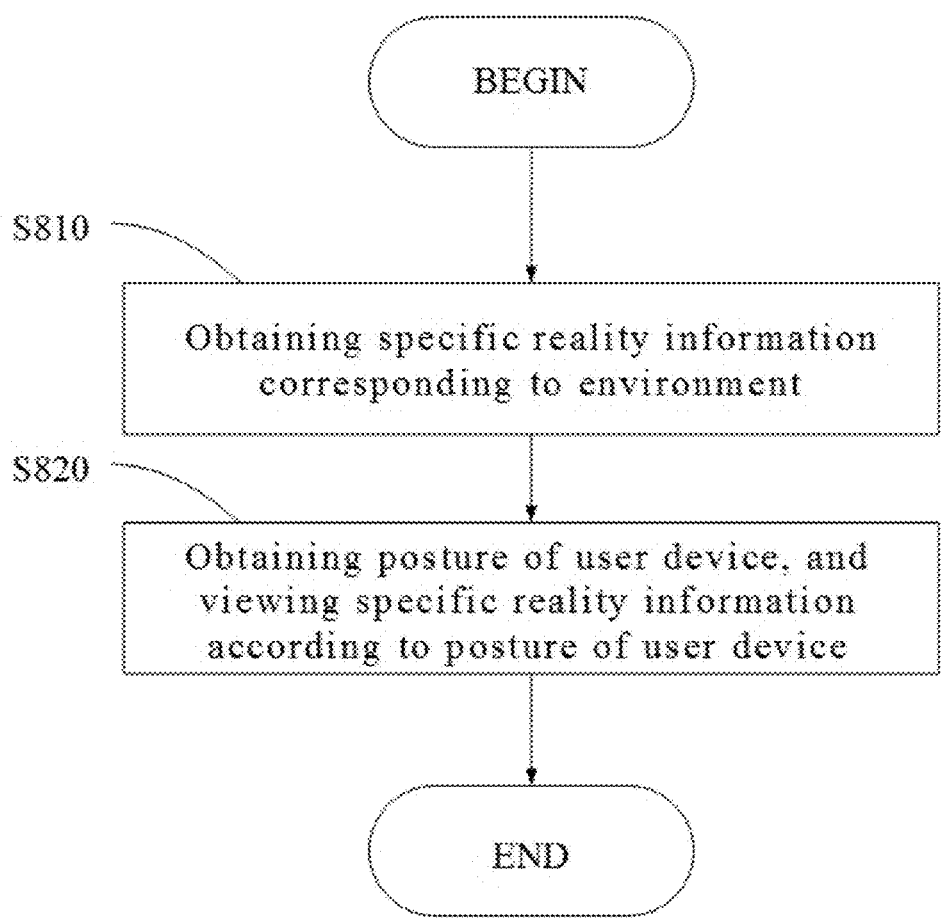
FIG. 8 is a flowchart of another embodiment of a method for presenting specific information in a virtual reality environment of the invention.

FIG. 8 is a flowchart of another embodiment of a method for presenting specific information in a virtual reality environment of the invention. The method for presenting specific information in a virtual reality environment of the invention can be used in the user device 140 in FIG. 5.

In step S810, specific reality information corresponding to an environment is obtained. It is noted that, the specific reality information comprises a plurality of objects, and each object is defined at a position corresponding to a specific orientation in the environment. It is noted that, a corresponding environment can be constructed using the specific reality information. It is understood that, in some embodiments, the specific reality information may be image data composed of at least one statistic image or at least a series of images. It is noted that, in some embodiments, the specific reality information can be composed of image data in various orientations corresponding to an environment. Additionally, in some embodiments, the images can be used to generate the specific reality information using an image stitching software. It is understood that, the specific reality information can comprise at least one specific object, and the specific object has corresponding specific information, in which the electronic device 110 can generate various specific reality information, and the specific information corresponding to the specific object in the respective specific reality information may be different. In step S820, a posture corresponding to the user device 140 is detected/obtained using at least one sensor. It is understood that, in some embodiments, the posture can comprise orientation information of the user device 140, an elevation or depression angle of the user device 140, and/or a horizontal level of the user device 140. It is noted that, in some embodiments, the sensor may be an accelerometer and/or a Gyro sensor. It is noted that, the above sensors are only examples of the present application, and the present invention is not limited thereto. It is noted that, users can change the posture of the user device 140, thus to view/browse the specific reality information. It is understood that, a candidate reality portion can be determined from the specific reality information according to the posture of the user device 140. When the candidate reality portion includes the specific object, the specific information will be displayed at a position corresponding to the specific object.

Figure 9:
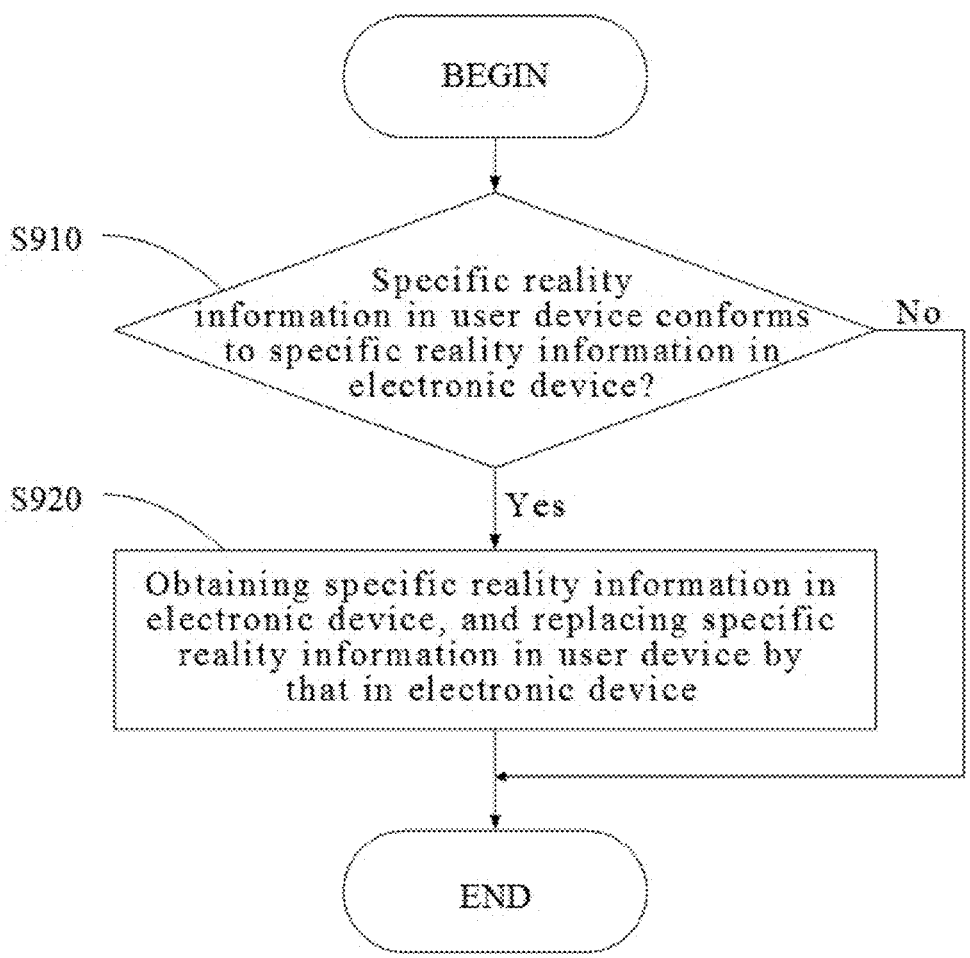
FIG. 9 is a flowchart of another embodiment of a method for presenting specific information in a virtual reality environment of the invention.

FIG. 9 is a flowchart of another embodiment of a method for presenting specific information in a virtual reality environment of the invention. The method for presenting specific information in a virtual reality environment of the invention can be used in the user device 140 in FIG. 5.

In step S910, it is determined whether the specific reality information in the user device 140 conforms to the specific reality information in the electronic device 110. It is understood that, in some embodiments, the user device 140 can periodically perform the determination of step S910. In some embodiments, when a player for viewing the reality information in the user device 140 is activated, the determination of step S910 can be performed. In some embodiments, when the specific reality information is going to be played/viewed in the user device 140, the determination of step S910 can be performed. When the specific reality information in the user device 140 conforms to the specific reality information in the electronic device 110 (Yes in step S910), the procedure is complete. When the specific reality information in the user device 140 does not conform to the specific reality information in the electronic device 110 (No in step S910), in step S920, the specific reality information is obtained from the electronic device 110, and the specific reality information in the user device 140 is replaced by the specific reality information in the electronic device 110. In other words, the user device 140 can ensure the version of the specific reality information inside the user device 140 is the newest one generated by the electronic device 110. As described, in some embodiments, the electronic device 110 can publish the specific reality information to the network server 150 via a network. In some embodiments, the determination of whether the specific reality information in the user device 140 conforms to the specific reality information in the electronic device 110 is performed by determining whether the specific reality information in the user device 140 conforms to the specific reality information in the network server 150.

Figure 10:
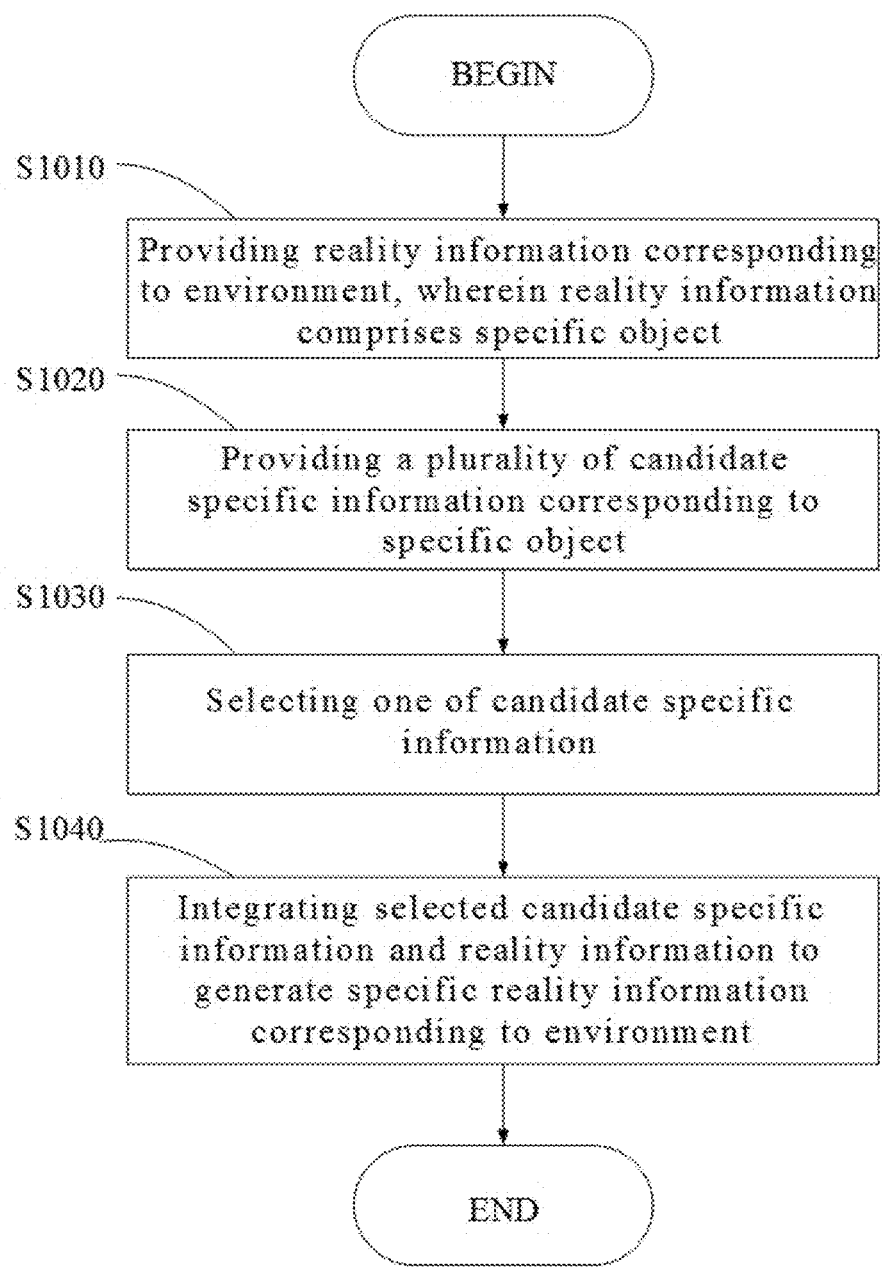
FIG. 10 is a flowchart of another embodiment of a method for presenting specific information in a virtual reality environment of the invention.

FIG. 10 is a flowchart of another embodiment of a method for presenting specific information in a virtual reality environment of the invention. The method for presenting specific information in a virtual reality environment of the invention can be used in the electronic device 110 in FIG. 1.

In step S1010, reality information corresponding to an environment is provided. It is noted that, the reality information comprises at least one specific object, and the specific object is defined at a position corresponding to a specific orientation in the environment. It is noted that, the reality information comprises a plurality of objects, and each object is defined at a position corresponding to a specific orientation in the environment. It is understood that, in some embodiments, a user interface for selecting at least one specific object from the objects in the reality information can be provided. It is noted that, a corresponding environment can be constructed using the reality information. It is understood that, in some embodiments, the reality information may be image data composed of at least one statistic image or at least a series of images. It is noted that, in some embodiments, the reality information can be composed of image data in various orientations corresponding to an environment. Additionally, in some embodiments, the images can be used to generate the reality information using an image stitching software. In step S1020, a plurality of candidate specific information corresponding to the specific object is provided. It is noted that, in the embodiment, the various specific information corresponding to the specific object can be preset in the electronic device 110. Similarly, in some embodiments, a content providing device 120 can connect to the electronic device 110 via a network, and transmit the candidate specific information corresponding to the specific object to the electronic device 110. In step S1030, one of the candidate specific information is selected. It is understood that, in some embodiments, a current time can be obtained, and one of the candidate specific information is selected according to the current time. In other words, different candidate specific information can be selected according to different time. It is understood that, one of the candidate specific information can be selected according to various applications and requirements in the present application, and the present invention is not limited thereto. After the candidate specific information is determined, in step S1040, the selected candidate specific information and the reality information are integrated to generate specific reality information corresponding to the environment. It is noted that, the selected candidate specific information is displayed at a position corresponding to the specific object in the environment when the specific reality information is viewed. Similarly, in some embodiments, when the reality information is first viewed, no information is displayed at the position corresponding to the specific object in the environment. After the specific information and the reality information are integrated, and the specific reality information is therefore generated, the specific information is displayed at a position corresponding to the specific object in the environment. In some embodiments, when the reality information is first viewed, preset information is displayed at the position corresponding to the specific object in the environment. After the specific information and the reality information are integrated, and the specific reality information is therefore generated, the preset information is replaced by the specific information, and the specific information is displayed at a position corresponding to the specific object in the environment. Additionally, in some embodiments, the electronic device 110 can transmit/publish the specific reality information to the network server 150 via a network, thus providing the specific reality information to be accessed by other users, such as at least one member of the content service platform.

Figure 11:
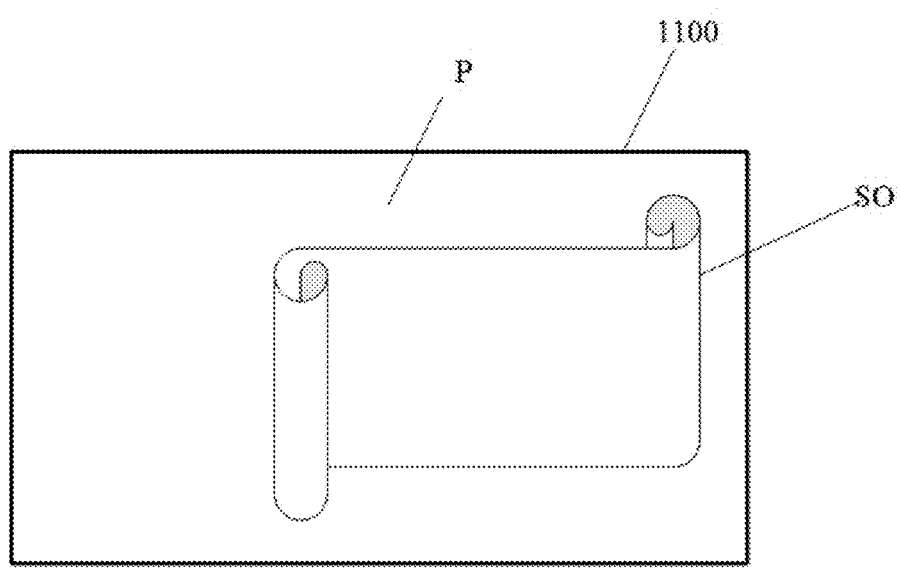
FIG. 11 is a schematic diagram illustrating an embodiment of an example of viewing of specific information of an environment via a user device of the invention.
Figure 12A:
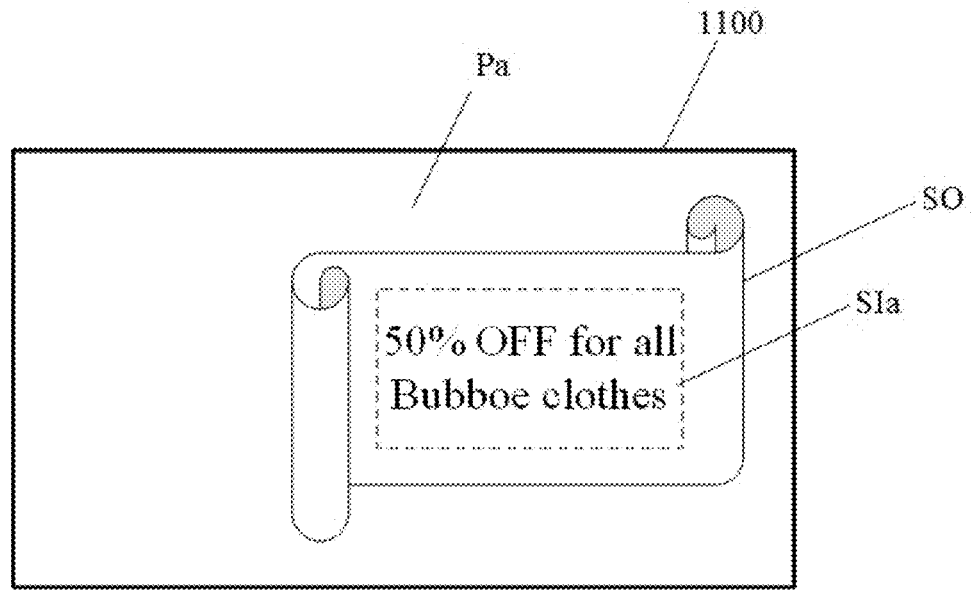
FIG. 12A is a schematic diagram illustrating an embodiment of an example of viewing of specific information of an environment via a user device of the invention.
Figure 12B:
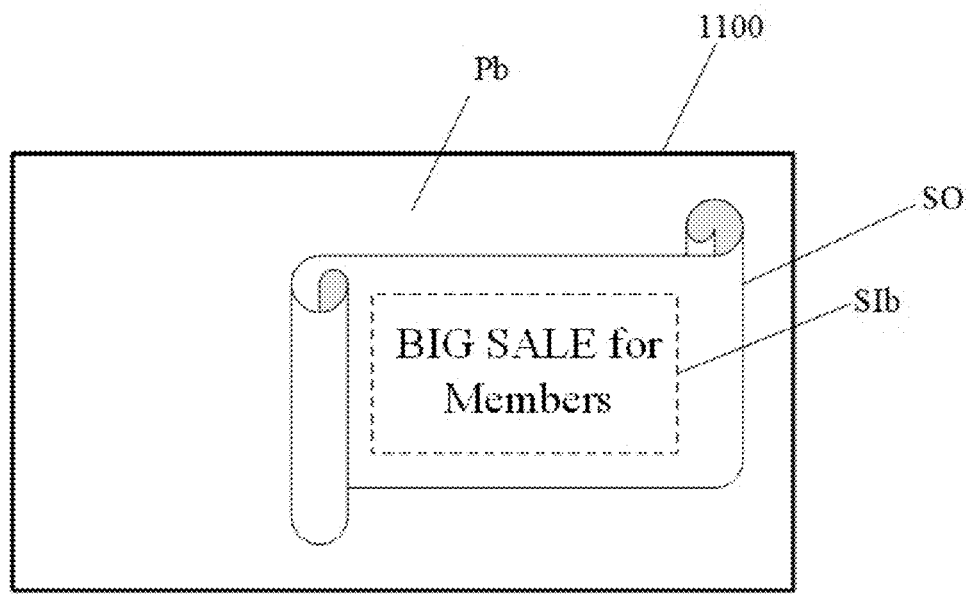
FIG. 12B is a schematic diagram illustrating an embodiment of an example of viewing of specific information of an environment via a user device of the invention.

An example follows. A display unit 1100 of a user device can display reality information P corresponding to an environment. The reality information P comprises a specific object SO. It is noted that, no information is preset to be displayed at a position corresponding to the specific object SO, as shown in FIG. 11. When first specific information SIa corresponding to the specific object SO is received, the electronic device 110 can generate first specific reality information Pa according to the first specific information SIa and the reality information P. A user can view the first specific reality information Pa via the display unit 1100, wherein the first specific information SIa is defined to be displayed at a position corresponding to specific object SO, as shown in FIG. 12A. Additionally, when second specific information SIb corresponding to the specific object SO is received, the electronic device 110 can generate second specific reality information Pb according to the second specific information SIb and the reality information P. The user can view the second specific reality information Pb via the display unit 1100, wherein the second specific information SIb is defined to be displayed at a position corresponding to specific object SO, as shown in FIG. 12B. It is noted that, the user can drive the user device to move, thus to view the specific reality information in various orientations. When a candidate reality portion determined from the specific reality information according to the posture of the user device comprises the specific object, the specific object and the corresponding specific information will be displayed in the display unit 1100 of the user device.

Therefore, the methods and systems for presenting specific information in a virtual reality environment of the present invention can present various specific information in reality information corresponding to an environment, thereby dynamically and efficiently generating the reality information with various contents, and further saving the cost of system resources required in the convention arts.

Methods for presenting specific information in a virtual reality environment, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for presenting specific information in a virtual reality environment, comprising:
providing reality information corresponding to an environment in an electronic device, wherein the reality information comprises at least one specific object;
determining whether specific information corresponding to the specific object is received or not by the electronic device;
when the specific information corresponding to the specific object is received, integrating, by the electronic device, the specific information and the reality information to generate specific reality information corresponding to the environment;
determining, by a user device, whether the specific reality information corresponding to the environment in the user device conforms to the specific reality information corresponding to the environment in the electronic device; and
when the specific reality information corresponding to the environment in the user device does not conform to the specific reality information corresponding to the environment in the electronic device, replacing the specific reality information corresponding to the environment in the user device by the specific reality information corresponding to the environment in the electronic device, in which the specific information is displayed at a position corresponding to the specific object in the environment when the specific reality information is viewed via the user device,
wherein when the reality information is first viewed, no information is displayed at the position corresponding to the specific object in the environment and the specific information is displayed at the position corresponding to the specific object in the environment after the specific information and the reality information are integrated to generate the specific reality information.

2. The method of claim 1, further comprising:
transmitting the specific information to the electronic device by a content providing device via a network; and
periodically determining whether the specific information is received, and periodically generating the specific reality information corresponding to the environment when the specific information is received by the electronic device.

3. The method of claim 1, further comprising:
obtaining a posture of the user device; and
viewing the specific reality information corresponding to the environment according to the posture of the user device, wherein when a candidate reality portion determined according to the posture of the user device comprises the specific object, the specific information is displayed at the position corresponding to the specific object.

4. The method of claim 1, further comprising after the specific reality information corresponding to the environment is generated, publishing the specific reality information corresponding to the environment to a network server via a network, wherein the determination of whether the specific reality information corresponding to the environment in the user device conforms to the specific reality information corresponding to the environment in the electronic device is performed by determining whether the specific reality information corresponding to the environment in the user device conforms to the specific reality information corresponding to the environment in the network server.

5. A system for presenting specific information in a virtual reality environment, comprising:
an electronic device, comprising:
a storage unit comprising reality information corresponding to an environment, wherein the reality information comprises at least one specific object; and
a processing unit determining whether specific information corresponding to the specific object is received or not, and when the specific information corresponding to the specific object is received, integrating the specific information and the reality information to generate specific reality information corresponding to the environment; and
a user device determining whether the specific reality information corresponding to the environment in the user device conforms to the specific reality information corresponding to the environment in the electronic device, and when the specific reality information corresponding to the environment in the user device does not conform to the specific reality information corresponding to the environment in the electronic device, replacing the specific reality information corresponding to the environment in the user device by the specific reality information corresponding to the environment in the electronic device, in which the specific information is displayed at a position corresponding to the specific object in the environment when the specific reality information is viewed via the user device, wherein when the reality information is first viewed, no information is displayed at the position corresponding to the specific object in the environment and the specific information is displayed at the position corresponding to the specific object in the environment after the specific information and the reality information are integrated to generate the specific reality information.

6. A machine-readable storage medium comprising a computer program, which, when executed, causes a device to perform a method for presenting specific information in a virtual reality environment, wherein the method comprises:

providing reality information corresponding to an environment in an electronic device, wherein the reality information comprises at least one specific object;

determining whether specific information corresponding to the specific object is received or not;

when the specific information corresponding to the specific object is received, integrating, by the electronic device, the specific information and the reality information to generate specific reality information corresponding to the environment;

when the specific reality information corresponding to the environment in the user device does not conform to the specific reality information corresponding to the environment in the electronic device, replacing the specific reality information corresponding to the environment in the user device by the specific reality information corresponding to the environment in the electronic device, in which the specific information is displayed at a position corresponding to the specific object in the environment when the specific reality information is viewed via the user device, wherein when the reality information is first viewed, no information is displayed at the position corresponding to the specific object in the environment and the specific information is displayed at the position corresponding to the specific object in the environment after the specific information and the reality information are integrated to generate the specific reality information.

* * * * *